(12) United States Patent
Huang et al.

(10) Patent No.: US 10,979,753 B2
(45) Date of Patent: Apr. 13, 2021

(54) PROVIDING CONTENT TO A PORTABLE DEVICE ACROSS MULTIPLE NETWORK CONNECTIONS

(71) Applicant: BCE Inc., Verdun (CA)

(72) Inventors: Hailun Huang, Burlington (CA); Haki Sharifi, Mississauga (CA); Chris Snyder, Toronto (CA); Peter Santos, Woodbridge (CA); Theodore Tse, Toronto (CA)

(73) Assignee: BCE INC., Verdun (CA)

( * ) Notice: Subject to any disclaimer, the term of this patent is extended or adjusted under 35 U.S.C. 154(b) by 0 days.

(21) Appl. No.: 16/701,510

(22) Filed: Dec. 3, 2019

(65) Prior Publication Data

US 2020/0107058 A1 Apr. 2, 2020

Related U.S. Application Data

(63) Continuation of application No. 14/751,917, filed on Jun. 26, 2015, now Pat. No. 10,499,098.

(60) Provisional application No. 62/018,065, filed on Jun. 27, 2014.

(51) Int. Cl.
*H04N 21/258* (2011.01)
*H04N 21/24* (2011.01)
*H04N 21/61* (2011.01)
*H04N 21/414* (2011.01)
*H04N 21/472* (2011.01)

(52) U.S. Cl.
CPC ... *H04N 21/25875* (2013.01); *H04N 21/2402* (2013.01); *H04N 21/41407* (2013.01); *H04N 21/47217* (2013.01); *H04N 21/6131* (2013.01)

(58) Field of Classification Search
CPC ......... H04N 21/25875; H04N 21/2402; H04N 21/41407; H04N 21/47217; H04N 21/6131
See application file for complete search history.

(56) References Cited

U.S. PATENT DOCUMENTS

2010/0226347 A1* 9/2010 Caldwell ............. H04L 63/0876 370/338

* cited by examiner

*Primary Examiner* — Joshua D Taylor
*Assistant Examiner* — Adil Ocak
(74) *Attorney, Agent, or Firm* — Gowling WLG (Canada) LLP

(57) ABSTRACT

Systems and methods for providing content to a portable device are describe. The systems and methods provide corresponding content to the portable device across different network connections.

18 Claims, 6 Drawing Sheets

PROVIDING CONTENT TO A PORTABLE DEVICE ACROSS MULTIPLE NETWORK CONNECTIONS

RELATED APPLICATIONS

This application is a Continuation of U.S. patent application Ser. No. 14/751,917, filed Jun. 26, 2015, which claims the benefit of US Provisional Application 62/018,065 filed Jun. 27, 2014, both of which are incorporated herein by reference in their entirety.

TECHNICAL FIELD

The current disclosure relates to providing content to a portable device, and in particular to providing corresponding content to the portable device across different network connections.

BACKGROUND

Media content, such as television shows, movies and sporting events can be viewed on a number of different content consumption or end-user devices. The content consumption devices may include, for example, television sets, smart phones, tablets as well as browsers on computers. A user may subscribe to one or more service offerings that provide access to specific content over different distribution or delivery platforms and across one or more content consumption devices. For example, a TV provider, such as a cable TV, IPTV or satellite TV provider can provide access to different TV channels or programming according to a subscription package. Depending upon the user's subscription, they may be authorized to view the content on one or more different types of the content consumption devices.

It will be appreciated that when accessing content on a portable device (e.g. tablet or smart phone etc.), the portable device may move across different network connections. For example, a user may begin watching content over an in-home network connection, but then leave their house where only a cellular data connection is available and yet, a short time later, be within range of a public Wi-Fi network connection. It is, therefore, desirable to be able to seamlessly view the content as network connections are switched. However, different content may or may not be accessible to a subscriber based on the services the user is subscribed to and the network connection used or available to access the content. It would be desirable to provide an improved end-user experience including being able to seamlessly stream content to a portable device moving across different network connections.

BRIEF DESCRIPTION OF THE DRAWINGS

Embodiments are described herein with references to the appended drawings, in which.

DETAILED DESCRIPTION

Figure 1:
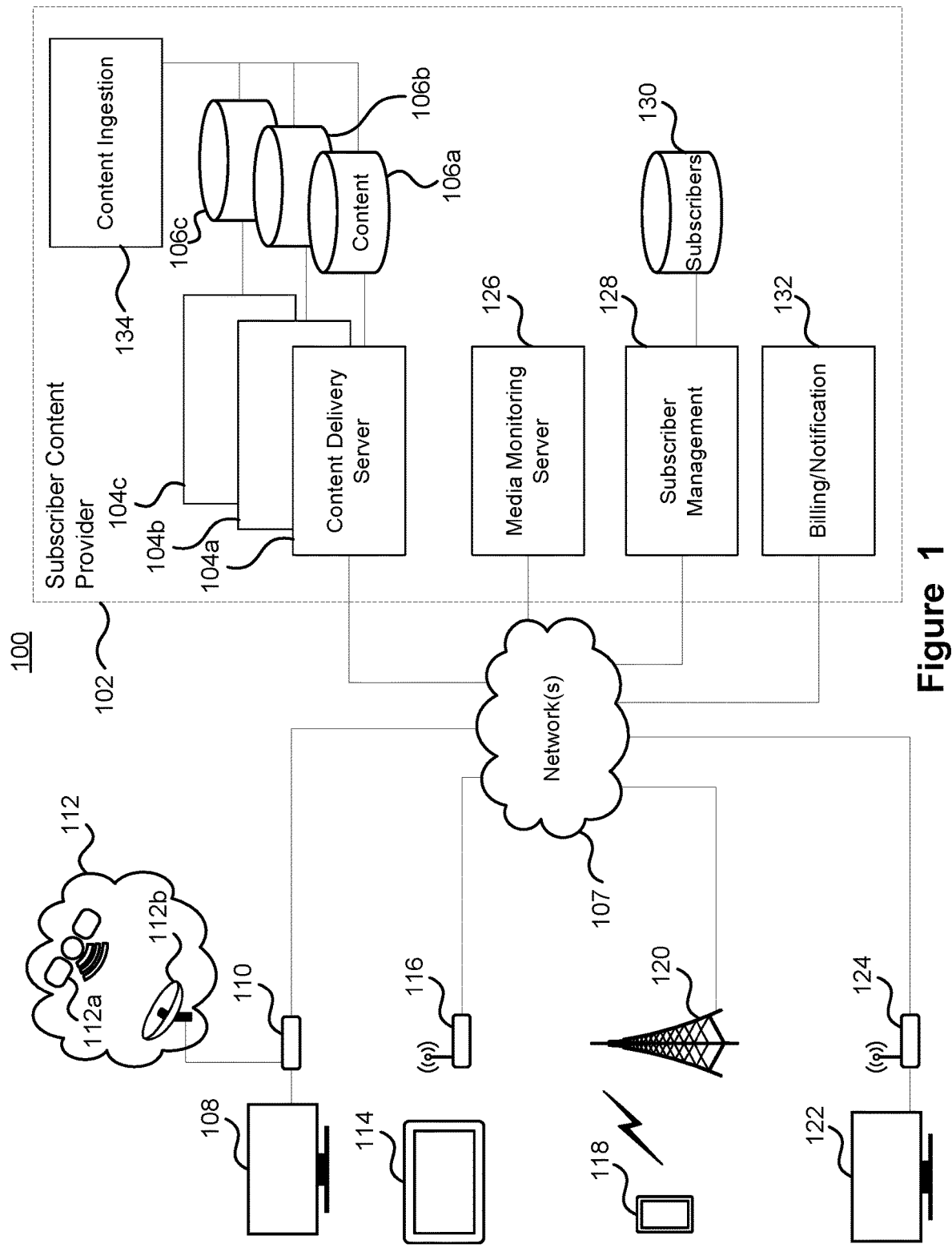
FIG. 1 depicts a content consumption system.

In accordance with the current disclosure, there is provided a method for providing content to a portable device comprising: receiving a playback request for content from the portable device associated with a subscriber of one or more content-provider services; determining a network connection of the portable device; determining if the subscriber is authorized to view the requested content based on the one or more content-provider services subscribed to and the determined network connection of the portable device; if the subscriber is not authorized to view the requested content, determining if there is corresponding content that the subscriber is authorized to view based on the one or more content-provider subscribed to and the determined network connection of the portable device; and providing authorized content to the portable device over the network connection or providing an indication that no content is authorized for viewing if it was determined that there is no authorized content or corresponding content.

In accordance with the current disclosure, there is further provided a device for providing content to a portable device comprising: a processing unit for executing instructions; and a memory unit for storing instructions, which when executed by the processing unit configure the device to: receive a playback request for content from the portable device associated with a subscriber of one or more content-provider services; determine a network connection of the portable device; determine if the subscriber is authorized to view the requested content based on the one or more content-provider services subscribed to and the determined network connection of the portable device; if the subscriber is not authorized to view the requested content, determine if there is corresponding content that the subscriber is authorized to view based on the one or more content-provider subscribed to and the determined network connection of the portable device; and provide authorized content to the portable device over the network connection or providing an indication that no content is authorized for viewing if it was determined that there is no authorized content or corresponding content.

In accordance with the current disclosure, there is further provided a method for providing an electronic programming guide to a portable device comprising: receiving an electronic programming guide (EPG) request from the portable device associated with a subscriber of one or more content provisioning services; determining a network connection of the portable device; determining available channels the subscriber is authorized to view on the portable device based on the one or more content provider services subscribed to and the determined network connection of the portable device; filtering duplicate channels from the available channels; and generating EPG data of the filtered channels.

In accordance with the current disclosure, there is further provided a device for providing an electronic programming guide to a portable device comprising: a processing unit for executing instructions; and a memory unit for storing instructions, which when executed by the processing unit configure the device to: receive an electronic programming guide (EPG) request from the portable device associated with a subscriber of one or more content provisioning services; determine a network connection of the portable device; determine available channels the subscriber is authorized to view on the portable device based on the one or more content provider services subscribed to and the determined network connection of the portable device; filter duplicate channels from the available channels; and generate EPG data of the filtered channels.

In accordance with the current disclosure, there is further provided a system for providing content to a portable device comprising: at least one portable device comprising: a processing unit for executing instructions; and a memory unit for storing instructions, which when executed by the processing unit configure the portable device to: detect a change in a network connection of the portable device; request content for playback; and request electronic programming guide data; and at least one server device comprising: a processing unit for executing instructions; and a memory unit for storing instructions, which when executed by the processing unit configure the server to: receive request for playback of content from the at least one portable device and determine if the requesting portable device is authorized to playback the requested content over the network connection of the portable device; and receive a request for EPG data from the at least one portable device, determine available channels for the at least one portable device requesting the EPG data and filter out duplicate channels from the determined available channels.

Content may be provided to a subscriber through various communication channels or over different distribution/delivery platforms. For example, a user may be able to receive media content, such as television shows, movies, sporting events, music etc. from a satellite TV provider, a cable TV provider, an IPTV (Internet Protocol Television) provider, an internet service provider (ISP), a cellular network provider etc. Each service provider (or content provider/distributor) may have a respective distribution service or delivery platform for providing the media content to a subscriber. A single content provider may also provide content to subscribers over one or more distribution or delivery platforms. For example, a company may provide satellite TV or cable television service, cellular network service, and internet service. A single user may have a subscription for receiving content over each of the different distribution or delivery platforms. However, each different content distribution platform may provide its content from respective content stores, even if the content is the same. That is, multiple versions of the same content, such as a television show, may be stored in multiple different locations, and possibly under different names or identifiers, for distribution by or over the different distribution or delivery platforms.

Depending upon the distribution channel or delivery platform, and possibly the communication network type as well as subscription rights, different content may be available to a subscriber. For example, a user may be a subscriber to IPTV services (e.g. residential STB account) as well as mobile TV services (e.g. a wireless device subscription with a TV or video-viewing application). The IPTV service may allow the subscriber to watch subscribed-to-TV channels while in their home (via a STB/TV configuration or, alternatively, on a tablet/PC using an in-home Wi-Fi network). The mobile TV service may provide its content, which may or may not overlap with the IPTV content, to the subscribers mobile device over a cellular network. A subscriber may be able to access content on multiple devices, from multiple service offerings across multiple distribution channels or delivery platforms. As described further below, it is possible to monitor content consumption of a subscriber on a mobile device as well as other content consumption devices.

FIG. 1 depicts an example of a content consumption system 100. The system 100 depicts a subscriber content provider/distributor system 102 that can provide media content to subscribers. The content provider/distributor system 102 may include a plurality of different content distribution channels or delivery platforms, depicted as content delivery servers 104a, 104b, 104c (referred to collectively as content delivery servers 104) and corresponding content data stores 106a, 106b, 106c. As an example, content delivery server 104a and content store 106a may provide a streaming IPTV services to subscribers, content delivery server 104b and content store 106b may provide mobile TV services to subscribers and content delivery server 104c and content store 106c may provide satellite TV services to subscribers. Each of the content delivery servers 104a, 104b, 104c may distribute content across its respective network, which may include the internet, cellular networks, satellite communication networks, telephone networks, cable networks, or other networks.

The media content may be distributed over respective networks 107 from the content delivery servers 104 to one or more content consumption devices of a user. The content consumption devices may include, for example a set top box (STB) 110 that receives the media content from a head-end system over a satellite network 112 comprising a satellite 112a and receiver dish 112b connected to the STB 110. The STB 110 may be connected to a television (TV) 108. Additionally or alternatively, the functionality of the STB 110 may incorporated into the television itself. Media content may also be streamed to content consumption devices such as a tablet 114, smart phone, laptop, PC or other portable device over a wired and/or wireless (e.g. public or private Wi-Fi) network provided by an access point 116. The media content may also be provided to a smart phone 118, tablet or similar portable device, over a cellular communication network 120. Media content may also be provided to a IPTV STB or IPTV-capable television 122 from an in-home network, provided by a wired and/or wireless WiFi access point 124. Although various content consumption devices are described, it will be appreciated that these devices are only intended as examples and the media content may be provided to a content consumption device in other ways.

The subscriber content provider system 102 can provide media content over various different distribution systems or delivery platforms, which may be separate from each other. In order to provide an improved user experience in accessing content across multiple distribution systems or delivery platforms, a media monitoring server 126 may be provided that monitors the media being consumed by a user. As described further herein, the media monitoring server 126 can monitor the content being consumed on a device and can control the delivery of content to the user.

The media monitoring server 126 may interact with a subscriber management system 128. The subscriber management system 128 may store subscriber information in a subscriber data store 130. The subscriber information may include, for example, a unique subscriber identifier, account information for each of the content delivery or distribution systems 104 the subscriber has an account for, billing information, etc.

The media monitoring server 126 may also interact with a billing notification system 132 that uses the content consumption information in order to provide metering and billing based on the content consumed, as well as possibly the connection type used in consuming the content.

As described above, media content can be provided to a subscriber over different communication channels and via different distribution systems or delivery platforms. The media content may be sourced from a content provider. The content provider typically provides the media content and metadata associated with the media content. Each of the content delivery systems may have specific requirements with regard to the encoding of a media asset and the formatting of its respective meta data. The subscriber content provider/distributor system 102 may include a content ingestion component 134 for receiving the media content and encoding the media asset for distribution across the various different distribution platforms or systems. The content ingestion component 134 may also be adapted to format the received metadata in accordance with the formatting requirements of the different distribution or delivery systems.

When a subscriber accesses or consumes content using a mobile device, it is possible for the network type used to access the content to change or switch during access.

Depending upon subscriber rights, and network access rights, content that was being streamed over a particular network connection may not be available to stream over another type of network connection. It is possible to monitor and determine a switch between network connections and determine the most appropriate content feed (e.g. TV feed or Mobile TV feed) to display in view of the current network connection (i.e. whether the content or media asset has rights to be distributed over the particular network) and the user's subscriptions.

The current invention enables wireless device and TV customers of a given service provider to share the same live channels even though different subscription packages relate to each service offering. In this way, the same channel can be split to two feeds to support two types of customers. Based on a user's subscription and network rights for a particular media asset, the system of the invention is able to display the correct channel feed to the user. The filtering logic depicted in the Appendices helps to eliminate redundancy and avoids displaying the same channel twice on the user device thereby improving the user experience.

Figure 2:
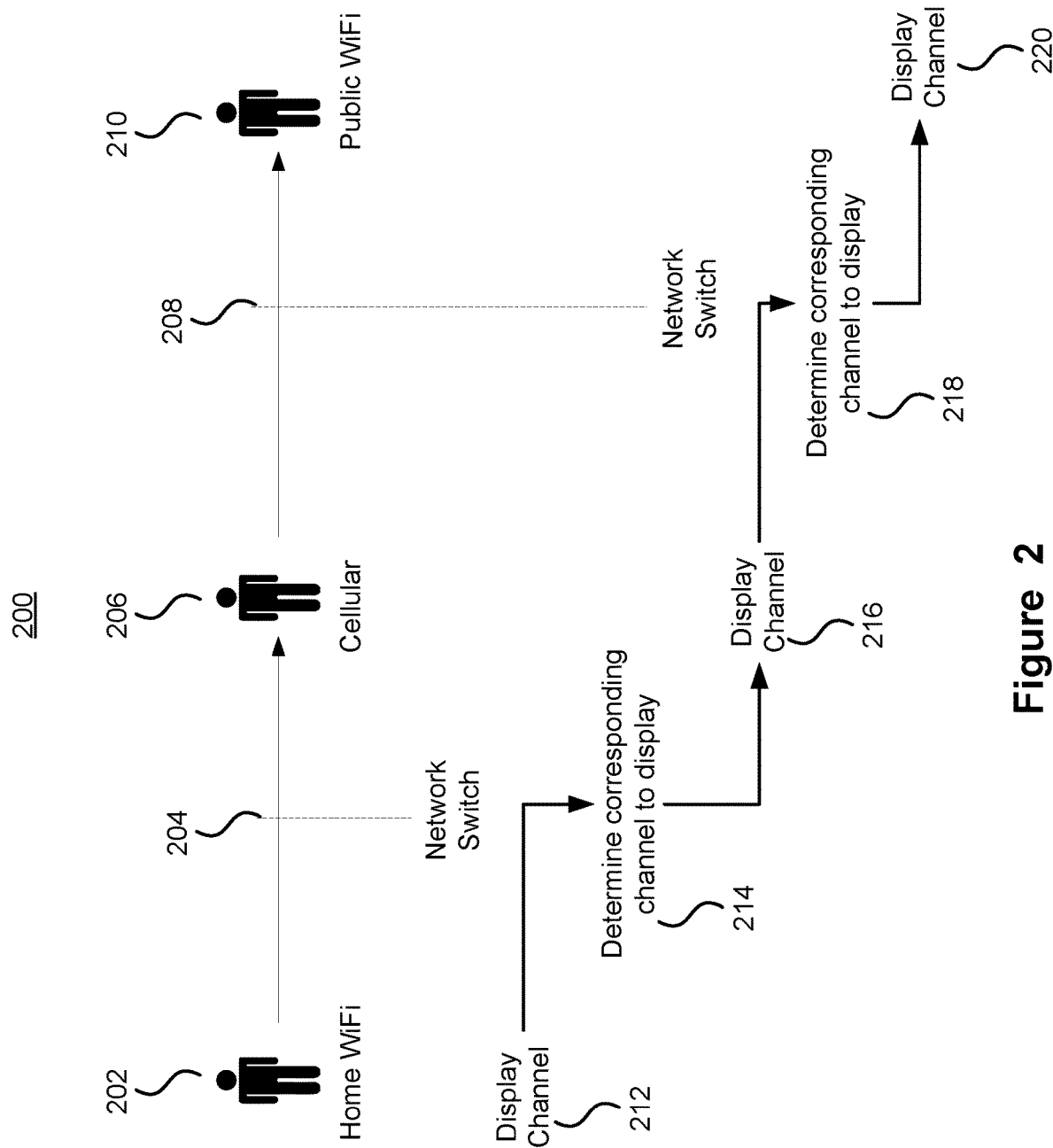
FIG. 2 depicts a process for displaying content on a mobile device accessing the content across multiple networks.

FIG. 2 depicts a process 200 for displaying content on a mobile device accessing the content across multiple networks. The process 200 depicts a user accessing content on a mobile device using their in-home Wi-Fi network 202. Next, the user transitions to a cellular data connection 206 causing a network switch 204 from the in-home Wi-Fi connection to the cellular data connection. Finally, the process also depicts a network switch 208 from the cellular data connection to a public WiFi connection 210.

At the outset of the above process, a channel is displayed on the user's mobile device 212. The channel feed displayed may be sourced from either a TV subscription or a mobile TV subscription. If the user has both a TV subscription and a mobile TV subscription, and the channel is available in both subscription packages, the channel feed displayed may be from or associated with the TV subscription (e.g. based on network rights for the particular channel or content). When displaying the programming guide to the user, duplicate channels, that is channels that provide the same content but related to different subscriptions of the user, may be filtered and displayed as a single channel. That is, the duplicate channels may be combined and displayed as a single channel.

When the network switch 204 is detected, the corresponding channel feed to display is determined 214 (using the logic defined in the Appendices) and then displayed 216 over the current network connection, in this case the cellular data connection. Determining the corresponding channel feed to display depends upon the network connection, and the subscriptions of the user as well as the access rights of the content over the particular network connection. If the channel is available to stream over the current network connection based on the user's TV subscription, the TV channel feed may be displayed. If the channel is not available to stream over the network connection based on the user's TV subscription, it can be determined if the channel is available or authorized to stream over the network connection based on the user's mobile TV subscription. For example, when the user is accessing content over their in-home network (e.g. Wi-Fi) connection, all of the channels available to the user based on their TV subscription may be available to stream to the user. However, as the user moves to a cellular network or an out-of-home WiFi network, not all of the channels available through the TV subscription may be available for streaming over the cellular network. In the case of cellular networks, the channels may be available for streaming based on the user's mobile TV subscription. If there are no corresponding channels available for streaming over the network connection, a message may be displayed to the user indicating that the channel could be subscribed to and providing additional information for subscribing to the channel.

When the user switches networks 208 from the cellular network to a public WiFi network, the corresponding channel feed to display is again determined at step 218 based on the prevailing network connection, user subscriptions and network access rights. Once the appropriate channel feed is determined, it is displayed 220.

Figure 3:
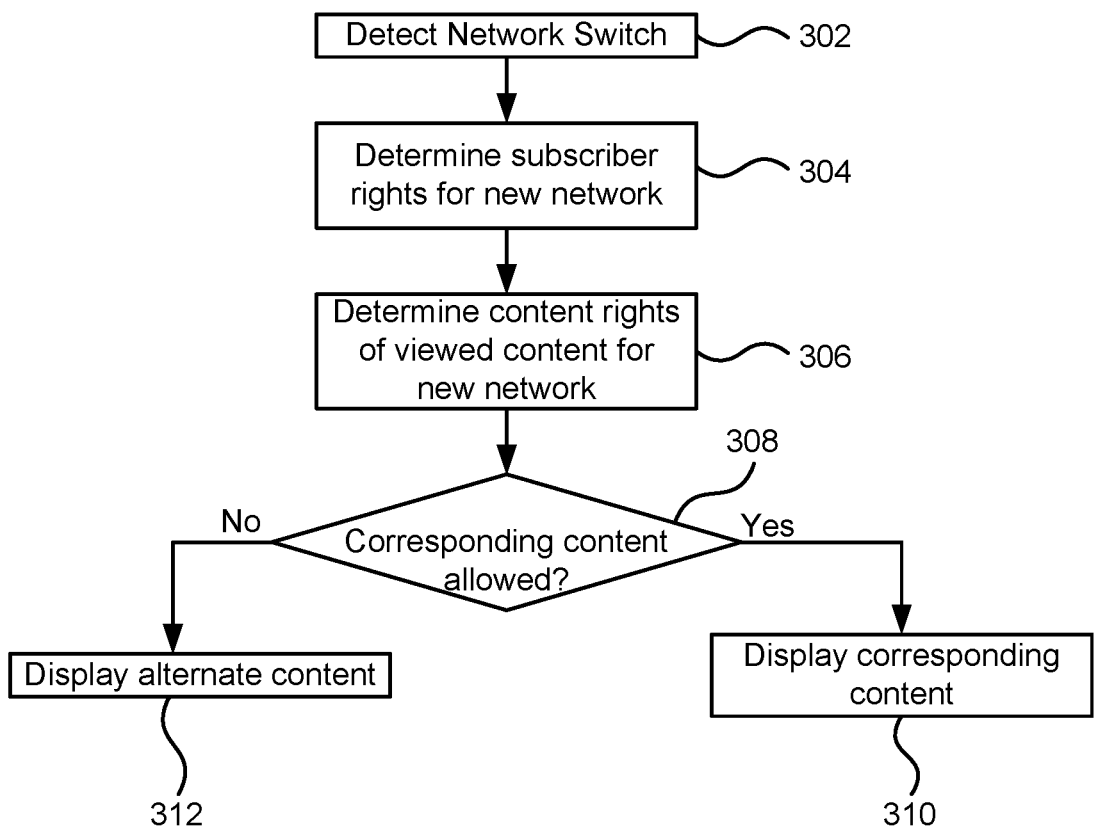
FIG. 3 depicts a method for displaying content on a mobile device accessing the content across multiple networks.

FIG. 3 depicts a method for displaying content on a mobile device accessing the content across multiple networks. The method 300 may be performed, for example, by the media monitoring server 126 referred to above. The method detects a switch in the network connection (302) and then determines the subscriber's rights for the new network connection (304) and also determines content rights of the viewed content for the new network (306). The method determines if there is corresponding content that can be accessed by the user over the prevailing network connection (308), and if there is (Yes at 308) the corresponding content is displayed. If there is multiple corresponding content available, the method may select a preferred content source or channel feed for display (see logic defined in the Appendices). If there is no corresponding content (No at 308) alternate or service provider-determined default content may be displayed (312). The alternate content may be an error message, or may provide an indication for subscribing to the content.

In addition to determining content to display based on the user's subscriptions and access rights of the content for accessing the content over different network connections, the displayed programming guide, which displays available channels may also be updated (e.g. using filtering logic) in order to remove duplicate channels that are available from different ones of a user's subscription. For example, when a user subscribes to multiple content sources or content distribution services, such as a mobile TV source or service and a TV source or service, it is possible that certain channels may be available for streaming over a particular network from both sources or services. Further, in such scenarios, it may be preferable to display only a single version of the duplicate channels in the programming guide presented to the user. Duplicate content that is available to the user over the current or prevailing network connection may be filtered in order to remove the duplicate channels.

For example, a user who is both a mobile TV and TV customer (e.g. IPTV), may have access to a sports channel (e.g. TSN in Canada or ESPN in the United States) through their mobility or wireless device subscription but not through their IPTV (or cable TV, satellite TV) subscription. When accessing content, for example over a cellular or WiFi connection, the user may be presented with the mobile TV y TSN channel. The IPTV TSN channel feed will be suppressed by the system because the user has no subscription to the channel. If the user subscribed to TSN in their IPTV subscription, only one of the TSN channel feeds, that is the mobile TV TSN channel feed or the IPTV TSN channel feed, would be displayed (see logic defined in the Appendices). In addition to depending upon the user's subscription, the channel feed that is displayed may depend or be based upon network access or network distribution rights associated with the content. For example, using the example above, the TSN-IPTV channel feed may only be available to stream when the content is accessed over an in-home network connection, and as such, if the user is currently connected only by the cellular network, the TSN-IPTV channel feed would not be displayed.

Figure 4:
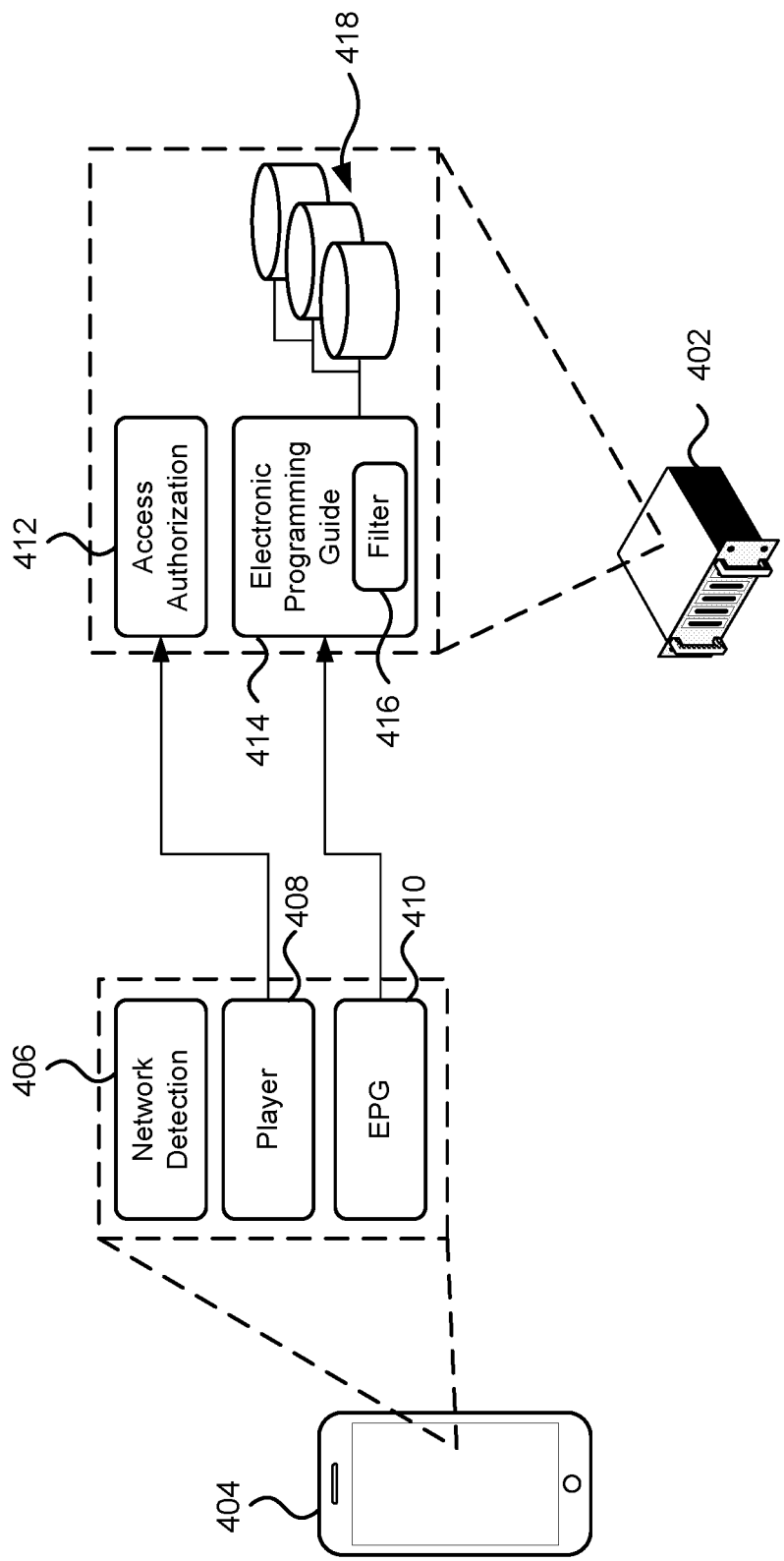
FIG. 4 depicts a system for displaying content on a mobile device accessing the content across multiple networks.

FIG. 4 depicts a system for displaying content on a mobile device accessing the content across multiple networks. The system 400 comprises server functionality 402 that may be provided by a content provider that provides content to subscribers through different channels, such as a mobile TV platform, and a home TV platform. The system further comprises a mobile device 404 of a subscriber that may be used to access content over different networks, such as over a cellular network, or over an in-home Wi-Fi network or over public Wi-Fi network. The particular networks used by the mobile device 402 to access the server functionality 402 are not depicted in FIG. 4. The mobile device 404 may be used to view content, such as a television show or a sporting event over a particular network. As the user moves, the network connection may change, for example a user may be viewing the content over Wi-Fi network at home. The user may leave their home and continue watching the content. The network connection may change from the in-home Wi-Fi to a cellular network and if the content is available for access over a cellular network, the viewing may continue. However, it is possible that the particular content, or the user's subscription, do not permit the content to be viewed outside of the home network and in such a case, the content viewing may not continue. However, if there is corresponding content available, such as a mobile version of the television channel being viewed, it may be delivered to the mobile device for viewing.

The mobile device 404 provides various functionality for use in viewing content. The functionality may include network detection functionality 406 that can detect when the network connection changes. The network detection functionality 406 may communicate the network switch to the server functionality 402, or the network switch may be communicated to player functionality 408 that displays the media content. The player functionality 408 may request the desired content from the server functionality, which may determine if the device is authorized to access the requested content. The player functionality 408 may include network connection information in the content authorization request. Alternatively, the server functionality 402 may determine the network connection of the mobile device 402 based on a previously received network switch notification. The mobile device functionality may also include electronic programming guide (EPG) functionality 410 that can display a programming guide of content that is available for viewing. The EPG functionality 410 may send an EPG request for a number of channels and a length of time for which the EPG should be provided, from EPG functionality 414 of the server 402. The EPG may display the programs or content available on a number of different channels over a period of time. When multiple versions of the same content are available, for example a mobile version of a channel and an in-home version, the EPG should consolidate repeated channels into a single channel. The channel consolidation may be done by the EPG functionality 410 on the mobile device or by the server functionality 402.

The server functionality 402 is depicted as being provided by a single server; however, the functionality may be provided by one or more physical and/or virtual servers. The server functionality 402 includes access authorization functionality 412 that may receive content playback requests from a mobile device and determine if the user is authorized to playback the requested content. The determination may be based on the subscriptions of the user, for example what TV channels the user has subscribed to, as well as the current network connection of the mobile device. If the user is authorized to view the requested content, the content may be provided to the mobile device. If the user is not authorized to view the requested content, it may be determined if there is corresponding content that the user is authorized to view and if there is, the corresponding content may be returned for viewing. For example, if the user requests an in-home channel while connected over a cellular connection, which is assumed to mean the user is not in the home, it may not be possible to view the requested channel; however there may be a mobile version of the same channel available. If the user is a subscriber to mobile TV the corresponding channel may be viewed.

In addition to the access authorization functionality 412 that can determine if a user is authorized to access content, the server 402 may also include EPG functionality 414. The EPG functionality 414 may receive a request from a portable device to provide EPG data that provides a schedule of content available on the portable device. Upon receiving an EPG request, the EPG functionality 414 may determine content provisioning services the user is subscribed to and what channels are available to the subscriber. The available content to be included in the EPG data may also be determined based on the network connection of the portable device and the content rights associated with the particular content. A subscriber requesting EPG data may be subscribed to multiple different services that each provide content, and as such the same content may be available to the user from multiple different services. Filter functionality 416 may filter out the duplicate channels that are available to the subscriber. The filtering of the duplicate channels may be done according to the availability of the content over the network connection of the portable device. The EPG functionality 416 may access the available content as well as the content access rights of the associated content and subscriber information from one or more databases 418. Once the EPG data is generated, it may be transmitted to the portable device for display.

Figure 5:
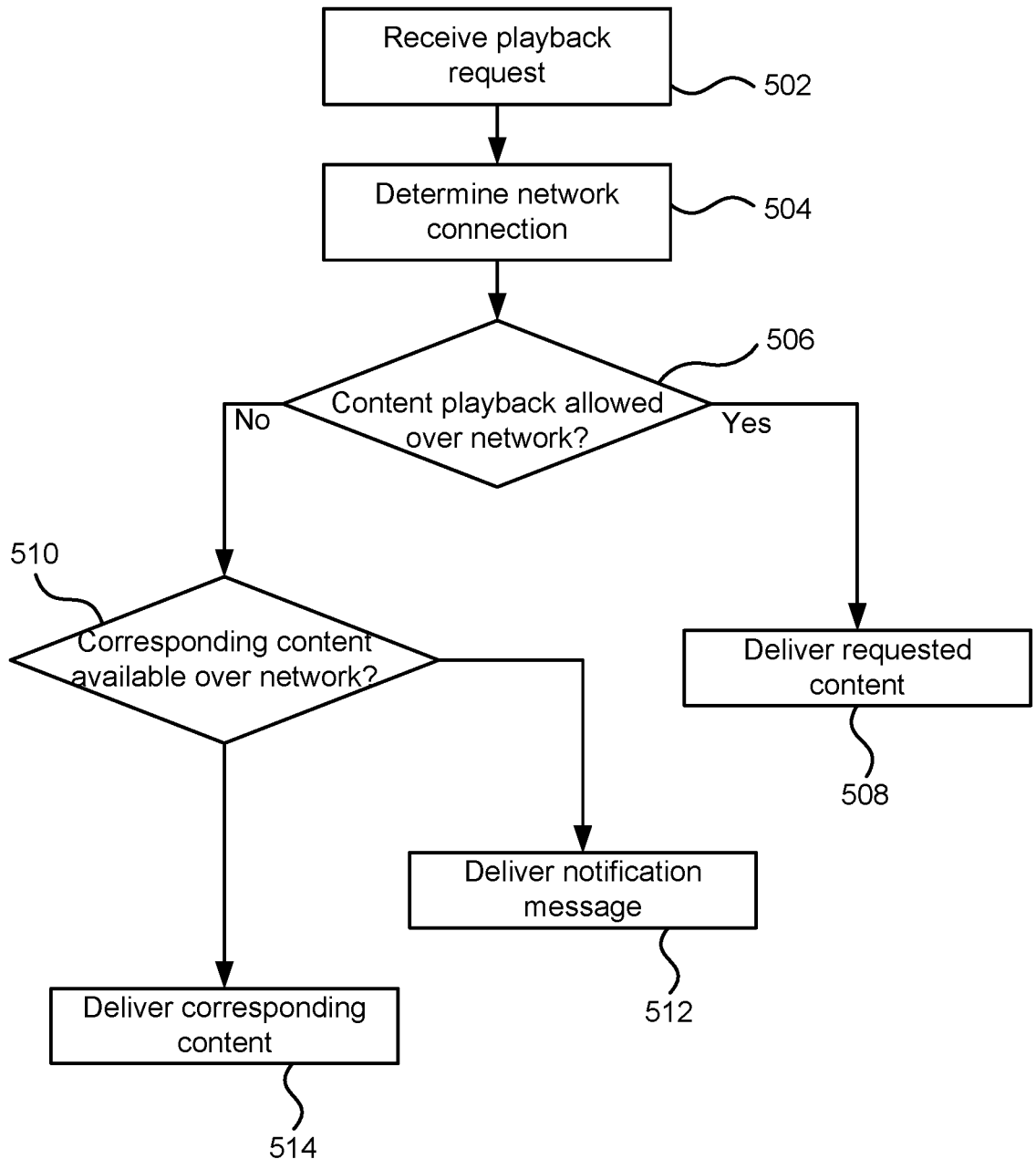
FIG. 5 depicts a method for providing content to a portable device over multiple network connections.

FIG. 5 depicts a method for providing content to a portable device over multiple network connections. The method 500 may be performed by one or more servers associated with a content provider. The method receives a playback request (502) from a portable device. The playback request may include an indication of the desired content to be watched, an identifier associated with the subscriber or a device associated with the subscriber, as well as an indication of the network connection type. The network connection type may be for example a cellular connection, an in-home Wi-Fi connection, or a public Wi-Fi connection. The network connection of the portable device is determined (504). The network connection may be determined from the playback request if the portable device includes network connection information in the request, or may be determined from other network devices that can determine the connection used by the portable device. The method determines if the content requested for playback is allowed to be viewed by the subscriber over the network (506). The requested content may be associated with indications of whether or not it may be accessed over the different network connection types. The content rights for the same content may differ depending upon the service from which the content is delivered. The content available from each of the services may be associated with access rights indicating whether or not the service may allow subscribers to access the content over different network connection types. For example, a certain piece of content may allow a first service to provide the content over an in-home Wi-Fi network connection, but not over other Wi-Fi connections or cellular network connections. When requested content is available over multiple different services the user is subscribed to, the service to use for providing the content may be selected based on predetermined preferences. For example, a first service may be preferred over a second service, and as such if the content is available from both services, the content will be provided from the first service. If the requested content is allowed over the network connection (Yes at 506) the requested content may be provided to the portable device (508). If the requested content is not allowed over the network connection (No at 506) the method may determine if there is corresponding content that may be provided to the subscriber over the network connection (510). If the corresponding content is available (Yes at 510) the corresponding content may be provided to the subscriber (512). If the corresponding content is not available (No at 510) the subscriber may be presented with an indication that the requested content is not available (512). The indication may provide instructions to the user on how to access the content.

Figure 6:
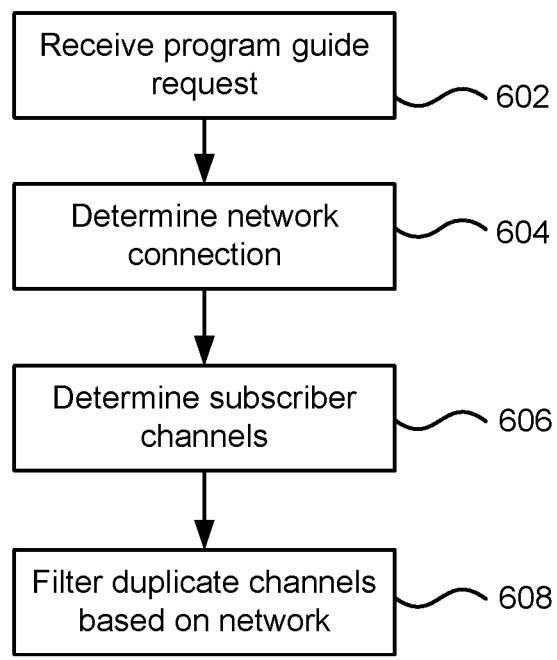
FIG. 6 depicts a method of providing electronic programming guide data to a portable device.

FIG. 6 depicts a method of providing electronic programming guide data to a portable device. The method 600 may be performed by one or more servers associated with a content provider. The method receives a request for EPG data from a portable device (602). The request may include network connection information, an indication of the subscriber or a device associated with the subscriber, as well as an indication of the number of channels for which the schedule EPG data should be provided as well as a length of time for the schedule. The method determines the network connection (604) of the portable device and based on the user's subscriptions and the content rights associated with different network access, the content available to the subscriber over the current network connection may be determined (606). Once the available content is determined, the content list may be filtered in order to remove duplicate channels. The filtering of duplicate channels may be based on the network connection services over which the content is available (608). The filtered list of available content may be used to generate an EPG schedule for transmission to the portable device.

The above has described various functionality provided by various systems. The functionality may be provided as a combination of hardware, firmware and software comprising instructions stored in a memory that are executed by a processor. The executed instructions configure devices to provide at least some of the functionality described. Although specific embodiments are described herein, it will be appreciated that modifications may be made to the embodiments without departing from the scope of the current teachings. Accordingly, the scope of the appended claims should not be limited by the specific embodiments set forth, but should be given the broadest interpretation consistent with the teachings of the description as a whole.

What is claimed is:

1. A method for providing an electronic programming guide to a portable device comprising:
    receiving an electronic programming guide (EPG) request from the portable device associated with a subscriber of one or more content provider services;
    determining a network connection type of a network connection used by the portable device;
    determining available channels the subscriber is authorized to playback on the portable device over the network connection based on the one or more content-provider services subscribed to and the determined network connection type;
    generating EPG data based on the available channels; and
    providing the EPG data to the portable device over the network connection.

2. The method of claim 1, further comprising:
    receiving a playback request for content from the portable device associated with a subscriber of one or more content-provider services;
    determining if the subscriber is authorized to playback the requested content over the network connection based on the one or more content-provider services subscribed to and the determined network connection type;
    if the subscriber is not authorized to view the requested content, determining if there is corresponding content that the subscriber is authorized to playback over the network connection based on the one or more content-provider subscribed to and the determined network connection type; and
    providing authorized content to the portable device over the network connection or providing an indication that no content is authorized for playback if it was determined that there is no authorized content or corresponding content.

3. The method of claim 2, wherein the indication that no content is authorized comprises:
    providing alternate content to the portable device on the second network connection.

4. The method of claim 3, wherein the alternate content comprises a message to subscribe to one of the plurality of content sources on which corresponding content is available over the network connection.

5. The method of claim 1, wherein the network connection type is one of:
    a cellular data connection;
    an in-home WiFi connection; and
    a non-in-home WiFi connection.

6. The method of claim 5, wherein the playback request is received from the portable device when the network connection of the portable device changes.

7. The method of claim 1, wherein the one or more content-provider services comprise at least one of:
    a direct-to-home (DTH) subscription service;
    a mobile television (MTV) subscription service;
    an internet protocol television (IPTV) subscription service; and
    a video-on-demand (VOD) service.

8. The method of claim 1, further comprising filtering duplicate channels from the available channels used in generating the EPG data, wherein filtering duplicate channels from the available channels comprises identifying corresponding channels available from two or more content-provider services and removing duplicate channels of the two or more corresponding channels.

9. The method of claim 1, wherein the received EPG request specifies a number of channels to return and a length of time for the EPG data.

10. A non-transitory computer readable medium storing instructions, which when executed by a processing unit of a device configure the device to:
receiving a playback request for content from the portable device associated with a subscriber of one or more content-provider services;
determining if the subscriber is authorized to playback the requested content over the network connection based on the one or more content-provider services subscribed to and the determined network connection type;
if the subscriber is not authorized to view the requested content, determining if there is corresponding content that the subscriber is authorized to playback over the network connection based on the one or more content-provider subscribed to and the determined network connection type; and
providing authorized content to the portable device over the network connection or providing an indication that no content is authorized for playback if it was determined that there is no authorized content or corresponding content.

11. The non-transitory computer readable medium of claim 10, wherein the network connection is one of:
a cellular data connection;
an in-home WiFi connection; and
a non-in-home WiFi connection.

12. The non-transitory computer readable medium of claim 11, wherein the playback request is received from the portable device when the network connection of the portable device changes.

13. The non-transitory computer readable medium of claim 10, wherein the indication that no content is authorized comprises:
providing alternate content to the portable device on the second network connection.

14. The non-transitory computer readable medium of claim 13, wherein the alternate content comprises a message to subscribe to one of the plurality of content sources on which corresponding content is available over the network connection.

15. The non-transitory computer readable medium of claim 10, wherein the one or more content-provider services comprise at least one of:
a direct-to-home (DTH) subscription service;
a mobile television (MTV) subscription service;
an internet protocol television (IPTV) subscription service; and
a video-on-demand (VOD) service.

16. A non-transitory computer readable medium storing instructions, which when executed by a processing unit of a device configure the device to:
receiving an electronic programming guide (EPG) request from the portable device associated with a subscriber of one or more content provider services;
determining a network connection type of a network connection used by the portable device;
determining available channels the subscriber is authorized to playback on the portable device over the network connection based on the one or more content-provider services subscribed to and the determined network connection type;
generate EPG data based on the available channels; and
provide the EPG data to the portable device over the network connection.

17. The non-transitory computer readable medium of claim 16, wherein the instructions, when executed by the processing unit, further configure the device to filter duplicate channels from the available channels used in generating the EPG data, wherein filtering duplicate channels from the available channels comprises identifying corresponding channels available from two or more content-provider services and removing duplicate channels of the two or more corresponding channels.

18. The non-transitory computer readable medium of claim 16, wherein the received EPG request specifies a number of channels to return and a length of time for the EPG data.

* * * * *